United States Patent [19]

White et al.

[11] 3,959,129

[45] May 25, 1976

[54] WASTE TREATMENT PROCESS

[75] Inventors: Harold R. White, New Lenox; Alexander J. Doncer, Burbank, both of Ill.

[73] Assignee: Alar Engineering Corporation, Bedford Park, Chicago, Ill.

[22] Filed: Jan. 14, 1974

[21] Appl. No.: 432,950

[52] U.S. Cl. .................................. 210/28; 210/53; 210/75
[51] Int. Cl.² ........................................ B01D 21/01
[58] Field of Search .................. 210/39, 40, 42, 44, 210/51–53, 58, 59, 75, 28

[56] References Cited
UNITED STATES PATENTS

| | | | |
|---|---|---|---|
| 3,037,931 | 6/1962 | Gayhardt | 210/58 |
| 3,436,344 | 4/1969 | Canning et al. | 210/39 |
| 3,446,488 | 5/1969 | Mail et al. | 210/44 |
| 3,573,202 | 3/1971 | Sobota et al. | 210/18 |
| 3,835,045 | 9/1974 | Hussissian | 210/51 |
| 3,868,320 | 2/1975 | Hider et al. | 210/53 |

OTHER PUBLICATIONS

Babbitt, *Sewerage & Sewage Treatment*, 1958, 8th Edition, pp. 446–449.
Parsons, *Chemical Treatment*, 1965, pp. 101–107.

*Primary Examiner*—Charles N. Hart
*Assistant Examiner*—Peter A. Hruskoci
*Attorney, Agent, or Firm*—Hill, Gross, Simpson, Van Santen, Steadman, Chiara & Simpson

[57] ABSTRACT

A process for clean-up of pollutant ladent water of the type characteristically produced in conventional container manufacturing installations. Such waste water is derived typically from water based printing ink wash-up and/or starch adhesive wastes. The process produces highly purified, optionally colorless water adapted for re-use and/or discharge. The process employs chemical treatment of such a starting aqueous waste to facilitate removals of colloidal particles and heavy metals followed by physical removal of suspended solids. Optionally, the resulting treated water is further subjected to decolorization.

16 Claims, 2 Drawing Figures

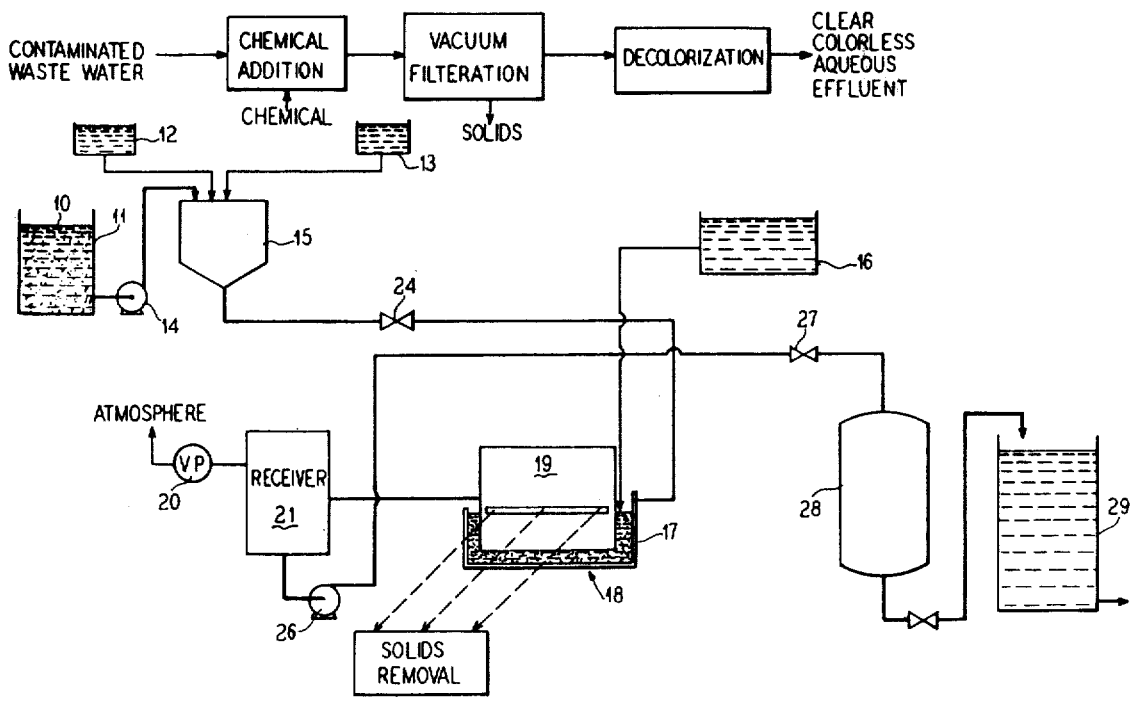

CONTAMINATED WASTE WATER → CHEMICAL ADDITION → VACUUM FILTRATION → DECOLORIZATION → CLEAR COLORLESS AQUEOUS EFFLUENT

CHEMICAL

SOLIDS

Fig. 2

WASTE TREATMENT PROCESS

BACKGROUND OF THE INVENTION

In the container manufacturing industry in recent years a new class of printing inks has come into wide spread usage. These inks are water based, pigmented compositions, are commonly available commercially, and are typically fast drying.

In a typical printing operation the printing press is washed down after a color change and at the end of a working day. A typical press may thus be washed down anywhere from 1 to 10 times a day using from 20 to 50 gallons of water per washdown. Each such washdown operation produces as waste a diluted ink water which heretofore has commonly been discharged into the nearest sewer at a rate which typically can range from about 200 to 3000 gallons per day. Such diluted ink water contains, among other contaminating impurities, iron, lead, and copper salts, as well as cyanides, chromates, and the like. Organic matter used in formulating such inks, including phenol and certain other hydrocarbons, may be present. Commonly, such ink water also contains finely divided colloidal particles, such as pigments. Such waste water has become a significant environmental pollutant.

Also in recent years, the container manufacturing industry has come to make extensive use of starch based adhesives, particularly in the manufacture of corrugated paper board and the like. A starch based adhesive is charged to a pan on a corrugator, applied therefrom to paper, the paper is contacted with other paper to make corrugated board, and the board product is heated to set and dry the adhesive. Typically, about once a day, starch pans are washed which produces a waste water containing starch. In addition, sometimes a partial batch of a starch based adhesive is dumped for various reasons. Commonly, these operations produce about 300 gallons of waste water per day.

Further, at a typical manufacturing site, adhesive making equipment is found, usually located in a so-called "starch room". The starch room and the equipment therein are commonly washed down about once a week using about 400 to 500 gallons of water.

The wash water from such starch adhesive clean up operations usually contains not only starch and other organic materials employed in starch adhesives (such as phenol, resorcinal, and resinous materials sometimes conventionally used in starch adhesive formulations), but also oily hydrocarbon materials from the machines used to produce corrugated and other containers. This waste water has an extremely high content of suspended solids, being on the order of from about 2000 to 60,000 parts solids per million parts water. The B.O.D. levels in such starch waste water commonly range from about 2000 to 14000 parts per million. Measurements herein are generally made according to the procedures given in the 13th edition of the U.S. Public Health Service publication "Standard Methods for the Analysis of Water and Waste Water". Such waste water has thus become a significant environmental pollutant which has been heretofore commonly discharged into the environment through the nearest sewer.

Recently, direct discharge of both such waste waters into sewers has become a violation of law, as has direct discharge to the ground or surface waters. Normal biological bacterial degradation is not suitable because of the high toxicity and concentration of such waste waters. Such waste waters actually dye and discolor river and sewage streams upon discharge thereinto. No acceptable means has been heretofore available for treating such waste waters to avoid environmental pollution therewith.

There is a strong need in the art for a system which will handle all wastes generated in a container manufacturing facility either singly or in combination. Such system must produce an effluent which can be discharged into substantially any approved sewer treatment system or, alternatively, which can be recycled for the manufacture of starch adhesives or recycled for washdown of water based or commonly termed "Flexographic" inks. Recycling is particularly attractive since if a manufacturer recycles he can never be in violation of law because no contamination is leaving his plant(s). Solid wastes recovered can leave the plant(s) for use as sanitary land fill or the like without polluting water provided that this fill contains no leachable substances which can contaminate run-off water. Development of a suitable waste water disposal system for container plants and the like has proven to be a formidable problem to solve.

BRIEF SUMMARY OF THE INVENTION

The present invention relates to a process for treatment of water based ink and/or starch aqueous wastes which overcome the difficulties and limitations of prior art waste water treatment technology and permits the production of a clear water for reuse or discharge to treatment plants. Solids recovered by the process of the invention may be used for sanitary land fill.

The present invention involves a chemical treatment to facilitate removal of colloidal particles and heavy metals followed by physical removal of these suspended solids. Optionally recovered water may be subjected to a decolorization step to remove residual color.

The process of this invention is especially well adapted for use in handling waste effluents from container manufacturing establishments which use water based printing inks and starch adhesives, such wastes having a concentrated colored quality and toxicity characteristics which make them particularly difficult to process by conventional waste treatment technology.

An object therefore, of the present invention is to provide a waste treatment system especially well adapted for container manufacture and water based printing ink users.

Another object is to provide a waste treatment system which is adapted to comply with all present and reasonably foreseeable future Federal or State anti-pollution ordinances.

Another object of this invention is to produce a highly purified optionally colorless water from starch adhesive waste water and water based ink clean-up water which product water is adapted for re-use or discharge to conventional treatment plants.

Another object of the invention is to provide the capability of handling individually or simultaneously water based printing ink washdown water and starch adhesive based waste water without any need to process such ink and starch waste separately.

Another object of this invention is to produce a technique whereby solid wastes from either water based adhesive clean-up or starch adhesives are generated in a substantially dry form adapted for easy removal, such as for sanitary land fill thereby eliminating the cost of special disposal services.

Another object is to provide a waste treatment system which is adapted for automated or substantially automated operation requiring a minimum of manpower for operation and maintenance.

Another object is to provide a waste treatment system which is adapted to be mounted in a unitized manner on skids with piping and wiring preassembled, for easy installation at any given location.

Another object is to provide a low-cost waste treatment system.

Other and further objects, purposes, advantages, aims, utilities, and features will be apparent to those skilled in the art from a reading of the present specification and drawings.

BRIEF DESCRIPTION OF DRAWINGS

In the drawings:

FIG. 1 shows in block diagrammatic form process steps employed characteristically in one mode of practicing the present invention; and FIG. 2 is a flow diagram illustrating the manner in which the process of FIG. 1 is practiced.

DETAILED DESCRIPTION

The present invention is directed to a process for treating waste waters. The waste waters comprise at least one waste water formulation selected from the group consisting of
 a. water derived from clean-up of fast-drying water based printing inks,
 b. water derived from clean-up of starch-based adhesives (including watery starch wastes produced by dumping partial batches of starch adhesives), and
 c. water derived from clean-up of accumulated oily hydrocarbon deposits on, and drippings from, machinery (e.g. of the type used in container manufacturing, and printing, and the like).

Such a waste water formulation or composition characteristically contains from about 2,000 to 60,000 parts per million (based on total composition) of suspended solids. These solids are characterized by having average diameters below about 200 millimicrons. In addition, such a waste water composition typically comprises on a 100 weight percent total composition weight basis from about 1 to 6 weight percent total combined non-aqueous matter with the balance up to 100 weight percent thereof being water. The non-aqueous matter includes the following contaminants in the respective indicated minimum amounts, typically:

Table 1

| Contaminant | Minimum amount present (parts by weight per million total composition) | Typical contaminant levels in a mixed waste water composition (parts by weight per million total composition) |
| --- | --- | --- |
| Chrome (trivalent) ions | 10. | 140. |
| Chrome (hexavalent) ions | 5.0 | 20. |
| Copper ions | 3.0 | 25. |
| Cyanide ions | 2.0 | 50. |
| Iron ions | 15.0 | 155. |
| Lead ions | 0.1 | 280 |
| Oil (hydrocarbon) | 100. | 1050 |

Table 1-continued

| Contaminant | Minimum amount present (parts by weight per million total composition) | Typical contaminant levels in a mixed waste water composition (parts by weight per million total composition) |
| --- | --- | --- |
| Phenol | 0.5 | 217 |
| Zinc ions | 2.0 | 10 |

A wash water composition has a color of at least 100 units and a mixed typical waste water composition has a color of about 50,000 units.

In practicing this invention one first mixes with such a waste water composition from about 500 to 5,000 parts per million (based on total composition) of a dissolved, water soluble iron salt. Then, one agitates the resulting mixture for a time ranging from about 20 minutes to 4 hours (preferably about 0.5 to 1 hour).

Thereafter one mixes with the so-agitated mixture from about 500 to 5,000 parts per million (based on total composition) of calcium hydroxide. The calcium hydroxide is comprised initially of particles not greater than about $250\mu$, and preferably not greater than about $100\mu$. Then, one agitates the resulting mixture for a time ranging from about 20 minutes to 4 hours (preferably about 0.5 to 1 hour).

Next, one continuously passes the resulting mixture over cylindrical outer surface portions of a horizontally rotating drum of a vacuum filter assembly. Such surface portions are previously coated with a layer of substantially completely water-insoluble, inert, particulate material having a particle size below about $250\mu$ (and preferably in the size range of from about 50 to $100\mu$). Simultaneously, one continuously draws aqueous portions of said resulting mixture through said surface portions of said horizontally rotating drum. Also simultaneously and continuously, one removes horizontally and longitudinally along a cylindrical side portion of said rotating drum the filter cake deposited on the outer cylindrical surface portions thereof.

Preferably, the process is conducted so that, along such longitudinal position of the horizontally rotating drum, the filter cake is removed by cutting away continuously a layer from the circumferential surface of the drum. This layer ranges in thickness from about 0.0001 to 0.05 inches, and preferably from about 0.0005 to 0.0020 inches, measured radially in relation to the drum, typically.

Preferably, the process of this invention is conducted under conditions such that the effluent from the vacuum filter assembly is collectable in a receiver. Preferably, also, the process of this invention involves passing the effluent from the vacuum filter assembly through a bed of activated carbon. Characteristically, the effluent from the vacuum filter assembly is red in hue, but after passing through a bed of activated carbon, the effluent from the carbon bed is substantially water white and colorless.

Referring to FIG. 1, there is seen in simplified form the sequence of steps employed in the practice of the present invention. Thus, to a starting waste water composition there is first added chemicals which flocculate, agglomerate and precipitate colloidal particles and heavy metals. Next, the resulting chemically treated waste water composition is subjected to rotary vacuum filtration to separate solids from the water phase thereof. Finally, but optionally, the resulting water phase is subjected to decolorization. The product is characteristically a clear, colorless aqueous effluent.

In FIG. 2 is shown the flow diagram of one embodiment of the present invention. Here, waste water 10 is collected in a holding tank 11, the size of the holding tank can range widely. A particularly convenient size being in the range from about 200 to 10,000 gallons. The treating chemicals are separately prepared in two different tanks 12 and 13. Thus, in a tank 12, a water soluble iron salt is dissolved in water to prepare a solution whose concentration preferably ranges from about 10 weight percent up to the saturation point in water of the particular iron salt employed. Conveniently and preferably a solution of from about 15 to 40 weight percent of water soluble iron salt is prepared. Typical suitable iron salts include ferrous and ferric (preferred) sulfate, ferrous and ferric chloride, and the like. Iron sulfates are generally preferred over iron halides since the halides appear to be more corrosive to equipment than the sulfates. Furthermore, iron chloride appears to be somewhat hygroscopic, making shipment thereof somewhat inconvenient.

In tank 13, one prepares a slurry of calcium hydroxide. Conveniently the amount of calcium hydroxide in the slurry ranges from about 5 to 25 weight percent and preferably from about 10 to 15 weight percent. Preferably, the particle size of the calcium hydroxide is initially in the range of from about 50 to 100$\mu$ (microns).

The waste water composition 10 in tank 11 is conveniently pumped, as by a pump 14, into a treatment tank 15. Conveniently the amount of waste liquid employed in a treatment tank 15 ranges from about 500 to 4,000 gallons though larger and smaller batches can be employed. Next, one gradually adds from tank 12 the solution of iron salt to the treatment tank 15. Preferably the addition of such iron salt occurs over a time interval ranging from about 10 to 20 minutes, although longer and shorter times may be employed, as those skilled in the art will appreciate. After addition of iron salt, it is preferred to allow the combined mixture to undergo a period with continuous agitation in order to achieve a maximum possible effect from the dissolved iron before further processing is carried out in accord with the teachings of this invention. It is believed (though there is no intent herein to be bound by theory) that the iron tends to break down the colloidal dispersion existing in the starting waste water 10. It is preferred that the composition of dissolved iron plus waste water have a pH in the range of from about 3 to 6 and more preferably about 4 to 5, and most preferably about 4.5.

In a next or subsequent step, the lime slurry from tank 13 is mixed with the resulting iron containing mixture produced as just described.

Alternatively, the lime may be added as a powder (in size ranges as above indicated), but slurry addition is preferred. Preferably, the lime whether or not in slurry form is added to the iron ion treated waste water composition over a period of time ranging from about 10 to 20 minutes, although longer and shorter times may be employed. After the lime has been added, it is preferred to allow the resulting mixture to undergo a waiting period with continuous agitation in order to achieve a maximum effect from the lime before further processing is carried out in accord with the teachings of this invention. Preferably, in this period, the pH of the composite resulting mixture is maintained in the range of from about 9 to 9.5 and more broadly from about 7.5 to 10. The lime is believed to cause precipitation of heavy metals and to result in formation of insoluble calcium sulfate.

Those skilled in the art will appreciate that conventional chemical pH controllers may be used to control and regulate pH, but, in general, such are not needed, but preferably such controllers are used.

Preferably, while the addition of chemicals as above described is progressing, but, as a practical matter, at any convenient preceding time, the filter aid for the rotary vacuum filter is prepared. In general, the filter aid is an inert, particulate, substantially completely water-insoluble material having a particle size below about 250$\mu$. A particularly convenient such material is an aluminum calcium silicate, such as fuller's earth, bentonite, diatomaceous earth, amocite asbestos, pulped paper, synthetic or natural fibers, or the like. Conveniently, the filter aid is prepared as a slurry of from about 5 to 25 weight percent (total slurry weight) of such particulate material in water. The filter aid is conveniently prepared in a tank 16 following which it is discharged into the tank 17 of the rotary vacuum filter 18.

Rotary vacuum filters are well known to the prior art and do not as such constitute a part of the present invention. Such filters are described, for example, in the fifth edition of "Chemical Engineers' Handbook" by Perry and Chilton, McGraw Hill Book Company, 1973, at pages 19–76 through 19–78.

As the filter aid slurry is discharged into the tank 17, the drum 19 is vacuumized, as by means of a vacuum pump 20. Preferably a screen member is interposed over and about a drum before the filter aid is introduced as those skilled in the art will appreciate. A receiver 21 is positioned between pump 20 and drum 19, and pump 20 is interconnected to the interior of drum 19 by means of appropriate tubing (not detailed in FIG. 2). In addition, the drum 19 is revolved by a mechanical drive means (not shown in FIG. 2). Typical (vacuum) pressures maintained on the exterior surfaces of the drum 19 at this time range from about 4 to 12 psig, and typical drum rpm values range from about 0.5 to 2.0, though higher and lower pressures and rpm's, respectively, may be employed in the practice of this invention, as those skilled in the art will appreciate.

The filter aid is deposited as a layer upon the cylindrical working surfaces of the drum portion of the rotary vacuum filter 18 and held to such surfaces by the subatmospheric pressures used. Typical starting thicknesses of the layer of filter aid composition upon cylindrical surface portions of drum 19 range from about ½ to 6 inches, and preferably is from about 1 to 2 inches and the amount of filter aid slurry added is chosen so as to be sufficient to produce a layer of this thickness. After the filter aid has thus been deposited upon cylindrical surface portions of drum 19, the chemically treated waste liquid in treatment tank 15 is allowed to pass into the tank 17 of the rotary vacuum filter 18 as by opening the valve 24. A pump (not shown) may be used to transfer the liquid system from treatment tank 15 into filter tank 17.

Using the above indicated pressures and drum rpm's, the chemically treated waste liquid undergoes filtration to separate waste solids from waste liquids. The liquids of effluent is drawn off and collected in the receiver 21. The solids are collected as a deposit upon the cylindrical surface portions of drum 19 as a filter cake and are continuously removed along a longitudinal position relative to one side of the rotating drum. While any conventional scraping arrangement can be employed to operate the rotary vacuum filter, in accordance with the teachings of the present invention, it is much preferred to use a scraper blade arrangement which systematically removes the filter cake and a small portion of the filter aid particulate material by cutting action as a layer ranging from about 0.0001 to 0.0010 inches in thickness measured radially relative to the axis of the drum though thinner and thicker layers may be taken off. Such an arrangement is particularly satisfying for present purposes, since the solid material is characteristically in a slimy form which makes separation and removal thereof difficult from the drum of the rotary vaccum filter without the use of the filter aid layer deposited as above described upon the cylindrical surface portions of the drum.

Solids so removed from the drum are found to be in a nearly dry condition characteristically and may be used directly for sanitary land-fill. Preferably the chemically treated waste water is continuously fed to the rotary vacuum filter 18 until all of a given batch of such treated waste water in tank 15 has been charged to filter 18. Preferably, the interrelationship between the amount of waste composition processed and the thickness of filter aid on the cylindrical surface portions of drum 19 is such that the filter aid is not consumed before the batch is processed. At the end of the processing, the vacuum pump is turned off, the drum 19 is flushed with clear water to remove any filter aid material remaining thereon, and this wash effluent is conveniently returned to the treatment tank 15.

It is preferred, as shown in FIG. 2, to employ decolorization to remove a characteristic and typical reddish color associated with effluent water collected in the receiver 21. For this purpose, the water in receiver 21 is conveniently pumped, as by means of a pump 26, past a now opened valve 27 into a column 28 filled with activated carbon (not shown). The activated carbon preferably functions to substantially completely decolorize the liquid so that effluent from the column 28 is passed as a clear colorless liquid into a storage tank 29 or the like. Preferably the decontaminated water in the tank 29 is recycled in subsequent clean-up operations in a container manufacturing plant, or is used in starch based adhesive preparation for operations of such plant.

While no particular critical dimensions are associated with a particular rotary vacuum filter arrangement usable in the processes of the present invention, it is preferred presently to employ such an apparatus which has a drum with a diameter of from about 12 to 48 inches, and preferably from about 24 to 36 inches. Also, during the actual filtration of a waste water chemically treated composition, it is preferred to employ a drum rpm in the range of about 0.5 to 2.0 though slower and faster speeds may be employed. The tank, such as tank 17 of filter 18, is preferably filled with chemicaly treated waste water to a level such that the angle which the surface of the waste water being processed makes with the cylindrical surface portions of the drum 19 ranges from about 30 to 120°. The scraper blade used is preferably advanced at a rate of about 0.0001 to 0.0010 inches per min. generally radially with respect to drum 19. Typical vacuum pressures exerted on the surface of the drum 19 during a filtration operation preferably range from about 4 to 12 psig, though higher and lower pressures may be employed.

Dimensions of the activated carbon bed in a column 28 can vary widely as can the characteristics of the particular activated carbon used therein. Preferably, such carbon bed is employed at an initial charge of from about 0.5 to 2.0 pounds of activated carbon per each gallon of effluent held in treatment tank 15, though smaller and larger amounts may be used. The carbon in the column 28 is periodically replaced as the activated carbon reaches some predetermined or desired reduced level of decolorization efficiency, as those skilled in the art will appreciate.

The effluent from the rotary vacuum filter typically and characteristically contains not more than the following respective quantities of the starting contaminants as shown in Table II below.

The effluent characteristically and typically has a color of not more than about 10 units and a pH in the range from about 8 to 9. The effluent typically contains from about 0.1 to 0.3 weight percent dissolved solids with the balance up to 100 weight percent being water. The effluent typically contains not more than about 10 parts per million suspended solids.

Table II

| Contaminant | Maximum Amount Present (Parts by weight per million total composition) |
| --- | --- |
| Chrome (trivalent) | 1.0 |
| Chrome (hexavalent) | 1.0 |
| Copper | 1.0 |
| Cyanide | 0.5 |
| Iron | 1.0 |
| Lead | 0.1 |
| Oil | 15. |
| Phenol | 0.1 |
| Zinc | 1.0 |

An outstanding feature of the present invention is in the fact that the starting waste compositions are relatively easy to de-water by the procedure provided herein. This procedure is the same regardless of the particular type of waste water starting material used; that is, either the water based ink wash water or the starch based adhesive aqueous wash water. Another outstanding feature of the present invention is that lead ions are easily removed to very low (tolerable) levels in product clear water. Lead removal has been a difficult problem to solve in the prior art. Still another outstanding feature of the present invention lies in the operational efficiencies and simplicities resulting from use of a continuously operating rotary vacuum filter as herein taught. The prior art usage of plate and frame filters not only involves expensive operational problems, but also such filters have a tendency to leak badly when used for a few years. Other type of pressure filters are extremely difficult to clean, particularly when used with waste water such as are presently involved.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification and drawings.

EXAMPLE A

A flocculant composition is prepared as follows: 50 pounds of $Fe_2(SO_4)_3 - 7H_2O$ is dissolved in 55 gallons of water to produce an aqueous solution of about 10 weight percent ferric sulfate.

EXAMPLE B

A flocculant composition is prepared as follows: 50 pounds of $FeCl_3$ is dissolved in 55 gallons of water to produce an aqueous solution of about 10 weight percent ferric chloride.

EXAMPLE C

A lime (calcium hydroxide) slurry is prepared as follows: 25 pounds of lime in the form of a finely divided white powder having particle sizes below about 250 $\mu$ is slowly added to about 55 gallons of water with stirring to produce an aqueous slurry comprised of about 5 weight percent lime with the balance up to 100 weight percent thereof being water. After formation, to prevent separation, the slurry is continuously agitated.

EXAMPLE D

A filter aid slurry is prepared as follows: 50 pounds of diatomaceous earth having a particle size in the range of from about 50 to 100 $\mu$ is slurried in 55 gallons of water to produce an aqueous slurry comprised of about 10 weight percent diatomaceous earth. After formation, the slurry is continuously agitated to prevent separation.

EXAMPLE E

A waste composition is collected from a container manufacturing plant in 2,000 gallon batches through the use of a holding tank. This waste composition is derived through washdown of flexographic ink from presses during clean-up operations during container manufacturing. Various colors of inks are employed and the waste thus produced is understood to have been produced through about 40 washdowns using about 50 gallons of water for each washdown.

EXAMPLE F

A waste composition is collected from a container manufacturing plant in 2,000 gallon batches through the use of a holding tank. This waste composition is produced through (A) cleanup of corrugated starch adhesive pans and oil drippings; (B) dumping of partial starch adhesive batches; and (C) clean-up of starch adhesive making equipment.

EXAMPLE G

A waste composition is collected from a container manufacturing plant in 2,000 gallon batches through the use of a holding tank. About 50 weight percent of this waste composition is derived by washdown of flexographic ink during clean-up operations following container imprinting. Various colors of inks are employed and the waste thus produced is understood to have been produced through wash-down of about 20 washdowns using about 50 gallons of water for each washdown. The remainder of the waste composition is derived from starch adhesives through washing of corrugator starch pans, through dumping of partial starch adhesive batches and through clean-up of adhesive making equipment.

The waste composition is also found to contain machine oil at the rate of about 1,000 parts per million. The waste composition is found to contain about 40,000 parts per million of suspended solids and to comprise on a bulk basis about 4 weight percent dissolved and suspended solids with the balance up to 100 weight percent thereof being water. The waste composition does not appear to settle appreciably on standing.

In Examples E, F, and G, the levels of contaminants in each instance is substantially above those minimum levels shown above in Table I, the color in each instance is above 200 units, and, in each instance the total combined non-aqueous matter ranges from about 3 to 5 weight percent with the balance up to 100 weight percent being water (total composition basis). In examples E and F the suspended solids fall in the range from about 40,000 to 50,000 parts per million total composition.

EXAMPLE H

For test and evaluation purposes 10 gallons of SAE 30 weight high detergent motor oil is added to 990 gallons water to produce a mixture of floating oil and water. A starting waste composition used in this invention can contain up to about 1 weight percent of such oil (100 wt %).

EXAMPLE I

Using an equipment arrangement and flow sheet as described above in reference to FIG. 2, the process of the present invention is practiced as follows:

About 2,000 gallons of an aqueous waste composition as described above in Example E is transferred from a holding tank into a treatment tank equipped with an agitator. Then over a period of about 15 minutes about 30 gallons of the flocculent composition of Example A is charged to the treatment tank with the tank's agitator operating.

The resulting composition contains about 2,000 parts per million of dissolved iron. The pH is between 4 and 5. Following addition of the flocculent composition, the resulting mixture is agitated for about 45 minutes.

Thereafter to the product mixture is added about 50 gallons of the lime slurry of Example C above over a time interval of about 10 minutes. The resulting composition initially contains about 2,000 parts per million of lime. The pH is between about 9 and 9.5. The resulting mixture is then continuously agitated for about 50 minutes.

About 50 gallons of the filter aid slurry prepared as in Example D above is charged to a rotary vacuum drum filter. The drum has a diameter of about 3ft, is revolved at a speed of about 1 rpm, and is equipped with a circumferential surface which has openings in the form of square holes each having a side of about ¼ inch, there being approximately 16 holes per square inch of cylindrical drum surface. The circumferential surface of the drum is covered with a cloth material of suitable characteristics to retain the diatomaceous earth on the surface of the drum. Interior circumferential surfaces of the drum are adapted to be vacuumized segmentally by means of appropriate internal piping and valving functionally associated with the drum assembly. Subatmospheric pressure of about 10 psig measured at the receiver is maintained on cylindrical surface portions of the drum. The drum has a length of about 2 feet.

The filter aid composition of Example D is charged to the rotary filter drum tank and the tank is filled with the filter aid composition to a level such that about ⅓ of the circumferential surface of the drum is immersed in the filter aid composition. In this way a cake of filter aid material of approximately 1 inch thickness (radially measured) is built up and deposited upon circumferential surfaces of the drum. The water drawn through the circumferential surfaces of the drum is drawn off and removed to a receiver.

Thereafter, to the so-prepared rotary vacuum filter there is continuously charged at the rate of about 600 gallons per hour from the treatment tank the product waste composition prepared as above described. The drum of the rotary vacuum filter is operated at about 1 rpm and the vacuum pressure is maintained at about 10 psig (measured as above indicated). A clear aqueous liquid is thus drawn off through the revolving cylinder at the rate of about 600 gallons per hour and the liquid so separated is charged to the receiver tank continuously. The solids build-up on the exterior surface of the filter aid pre-coat on the drum cylindrical surface is continuously cut-away by a knife blade longitudinally extending parallel to the axis of the drum. The blade continuously removes a filter cake of approximately 1/320 inch thick (radially measured) as the drum revolves. The knife blade is equipped with advance mechanism which continuously radially (relative to the drum) advances the knife blade towards the axis of the drums so that a constant filter cake thickness of approximately 1/320 inch is removed. The cake removed is discharged from the rotary vacuum filter and charged to a dumping container for solids removal such as a so-called "Dumpster", or the like.

After all fluid from the treatment tank has been charged to the rotary vacuum filter, and substantially all of the waste water composition has been passed through the rotary vacuum filter drum the line between the treatment tank and the rotary vacuum filter is cut off by means of a valve and the cylindrical surface of the drum of the rotary vacuum filter is washed down with clear water with the vacuum pump turned off thereby to remove substantially all of the filter aid composition from the cylindrical surface of the drum. The resulting slurry of material is pumped from the rotary vacuum filter to the treatment tank for holding to a subsequent operation.

The water in the receiver is analyzed and found to have the following contaminant levels:

Table III

| Contaminant | Parts per million total comp. |
| --- | --- |
| Chrome-trivalent | 0.06 |
| Chrome-hexavalent | 0.03 |
| Copper | 0 |
| Cyanide | 0.06 |
| Iron | 0.5 |
| Lead | 0.02 |
| Oil | 2.0 |
| Phenol | 0 |
| Zinc | 0.03 |

The water in the receiver train characteristically has a red color of about 200 units and has a pH between 8 and 9. The suspended solids content is under about 10 parts per million and the dissolved solids content is about 0.1 to 0.3 wt % with the balance up to 100 wt % being water.

EXAMPLE 2

The red colored product liquid produced by the procedure of Example 1 is passed through a column of activated carbon (available commercially from Calgon Co. as type CAL 12×40 mesh). The column has a diameter of about 42 inches and a height of about 8 feet.

Liquid from the receiver tank is passed through this carbon column at the rate of about 600 gallons per hour. The aqueous effluent from the carbon column is found to be clear and water white. This effluent is charged to a storage tank. The water in the storage tank can be used for subsequent starch adhesive manufacture or washdown of flexographic inks, or the like, as desired.

EXAMPLE 3

The procedure of Example 1 is repeated except that the starting waste composition is derived from Example F above. The effluent from the rotary vacuum filter is found to be a clear colorless liquid having a contaminant level similar to that of the liquid in Example 1.

EXAMPLE 4

The liquid produced in Example 3 is processed through a carbon column in the manner described in Example 2 and the product effluent is found to be a water white clear aqueous liquid which is conveyed to the storage tank as in Example 2, and which may be recycled as desired.

EXAMPLE 5

The procedure of Example 1 is repeated except that the waste composition used is that of Example G above. The effluent from the rotary vacuum filter is found to be a red colored liquid having a contaminant level similar to that of the liquid in Example 1.

EXAMPLE 6

The red colored liquid in the receiver produced by the procedure of Example 5 is processed through a carbon column in the manner of Example 2 and the product effluent is charged to a storage tank in the manner of Example 2. This product liquid is found to be a water white clear aqueous liquid which can be recycled as desired.

EXAMPLE 7

The procedure of Example 1 is repeated except that the waste composition used is that of Example H above. The effluent from the rotary vacuum filter is found to be an aqueous liquid which is apparently completely free of floating oil.

We claim:
1. A process for treating waste waters comprising the steps of sequentially:
   A. mixing with a waste water composition from about 500 to 5000 parts per million (based on total composition) of a dissolved, water-soluble iron salt, selected from the group consisting of ferrous sulfate, ferric sulfate, and ferric chloride, said waste water composition being selected from the group consisting of:
      a. water derived from clean-up of at least one water based printing ink of a flexographic type, and
      b. water derived from clean up of at least one starch based adhesive of a type used in corrugated paper board manufacture, and, said waste water composition containing from about 4,000 to 60,000 parts per million based on total composition of suspended solids below about 200 millimicrons in average diameter, said waste water composition comprising on a 100 weight percent total weight basis from about 1 to 6 weight percent combined non-aqueous matter with the balance thereof being water, said non-aqueous matter including contaminants selected from the group consisting of in the respective indicated minimum amounts:

| Contaminant | Minimum amount present (parts by weight per million total composition) |
|---|---|
| Chrome (trivalent) ions | 10. |
| Chrome (hexavalent) ions | 5.0 |
| Copper ions | 3.0 |
| Cyanide ions | 2.0 |
| Iron ions | 15.0 |
| Lead ions | 0.1 |
| Oil (hydrocarbon) | 100. |
| Phenol | 0.5 |
| Zinc ions | 2.0 |

B. agitating the resulting mixture for a time ranging from about 20 minutes to 4 hours, C. mixing with the so-agitated mixture from about 500 to 5000 parts per million (based on total composition) of calcium hydroxide, said calcium hydroxide being comprised initially of particles not greater than about 250μ, D. agitating the resulting mixture for a time ranging from about 20 minutes to 4 hours, and E. continuously passing the resulting mixture over cylindrical outer surface portions of a horizontally rotating drum of a vacuum filter assembly, said surface portions being coated with a layer of substantially completely water-insoluble, inert, particulate material having a particle size below about 250μ while simultaneously continuously drawing aqueous portions of said resulting mixture through said surface portions and also continuously removing along a longitudinal position of said rotating drum the filter cake deposited on said outer surface portions thereof.

2. The process of claim 1 wherein along said longitudinal position said filter cake is so removed by cutting away continuously a layer ranging from about 0.0001 to 0.001 in. in thickness measured radially relative to said drum.

3. The process of claim 1 wherein the effluent from said vacuum filter assembly is collected in a receiver.

4. The process of claim 1 wherein the effluent from said vacuum filter assembly is passed through a bed of activated carbon.

5. The process of claim 1 wherein said iron salt comprises ferric sulfate.

6. The process of claim 1 wherein said iron salt comprises ferrous sulfate.

7. The process of claim 1 wherein said iron salt comprises ferric chloride.

8. The process of claim 1 wherein said waste water composition is comprised of water derived from clean up of at least one water based printing ink.

9. The process of claim 8 wherein said waste water composition further contains up to about 1 weight percent (total composition basis) of hydrocarbon oil derived from clean-up of oily hydrocarbon deposits and drippings.

10. The process of claim 1 wherein said waste water composition is comprised of water derived from clean up of at least one aqueous starch based adhesive.

11. The process of claim 1 wherein said waste water composition is comprised of both water derived from clean up of at least one water based printing ink and water derived from clean up of at least one aqueous starch based adhesive.

12. The process of claim 1 wherein said waste water composition is comprised of water derived from clean-up of at least one starch based adhesive which further contains up to about 1 weight percent (total composition basis) of hydrocarbon oil.

13. The process of claim 12 wherein said waste water composition further contains water derived from clean up of water based inks.

14. The process of claim 1 wherein the effluent from said vacuum filter assembly has a contaminant composition as follows:

| Contaminant | Maximum Amount Present (Parts by weight per million total composition) |
|---|---|
| Chrome (trivalent) | 1.0 |
| Chrome (hexavalent) | 1.0 |
| Copper | 1.0 |
| Cyanide | 0.5 |
| Iron | 1.0 |
| Lead | 0.1 |
| Oil | 15. |
| Phenol | 0.1 |
| Zinc | 1.0 |

15. The process of claim 1 wherein the pH of said resulting mixture in steps (A) and (B) is maintained in the range from about 3 to 6.

16. The process of claim 1 wherein the pH of said resulting mixture in steps (C) and (D) is maintained in the range from about 7.5 to 10.

* * * * *